July 17, 1934.  S. H. HUNT  1,967,146
METHOD OF MAKING BASKETS
Filed Feb. 5, 1934
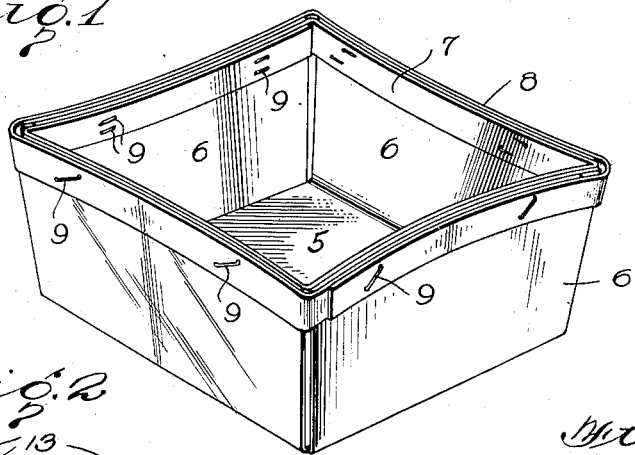
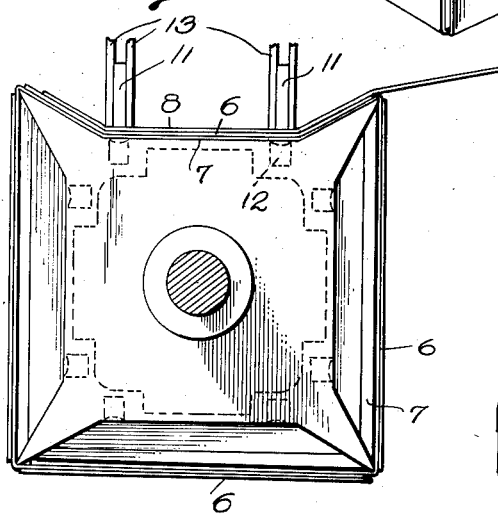
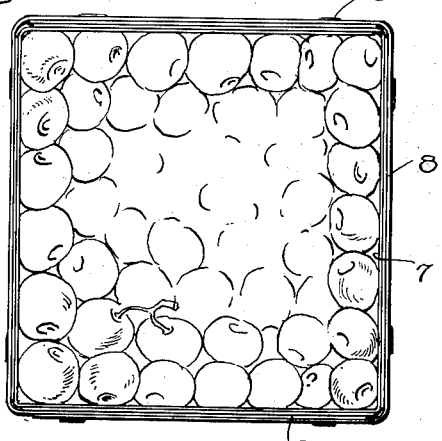
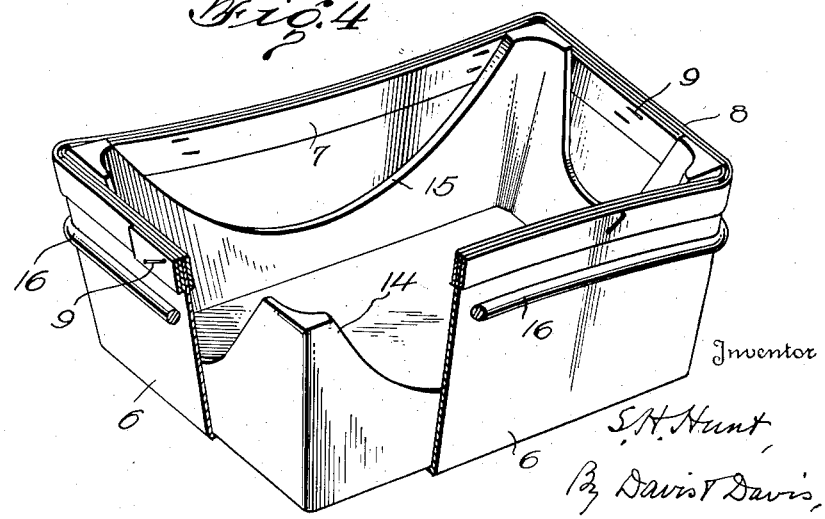
Inventor
S. H. Hunt,
By Davis & Davis,
Attorneys Patented July 17, 1934

1,967,146

UNITED STATES PATENT OFFICE 1,967,146

METHOD OF MAKING BASKETS

Sylvester H. Hunt, Norfolk, Va., assignor to Farmers Manufacturing Company, Norfolk, Va.

Application February 5, 1934, Serial No. 709,860

4 Claims. (Cl. 147—48)

This invention relates to that type of veneer basket or box employed for packing berries, small fruits and vegetables, and they are usually made in half-pint, pint, and quart sizes. They are generally constructed of two pieces or sheets of veneer laid across each other with their ends bent upwardly to form the side walls and a rim structure consisting of two wood veneer strips, one inside and the other outside, staples being driven through both strips or bands and the intermediate wall.

As these baskets are now made, after they are taken from the form on which they are stapled, the top edges or rims of their side walls bulge slightly outwardly, and when the commodity is packed into the basket under the usual pressure, the side walls bulge still further. These slightly bulging side walls make it troublesome to pack the filled baskets into crates. If they are packed snugly in the crates the side walls are pressed inwardly and thus injure the fruits or vegetables contained in the baskets, and besides when thus tightly packed they are troublesome to remove from the crate. It is the object of my invention to avoid the foregoing troubles by so making the basket that, without employing any extraneous devices, it will when removed from the form have its side walls normally bulged slightly inwardly. When a basket thus made is packed under the usual pressure the side walls will be flexed outwardly to a straight or approximately straight line by the pressure of the contents, so that the basket may be readily and properly packed into a crate for shipment.

Referring to the drawing annexed, Fig. 1 is a perspective view of a quart size basket or box as it appears when removed from the form on which it is made.

Fig. 2 is an end elevation of one shape of form which I may employ in making the basket, the basket being shown on the form in process of manufacture.

Fig. 3 is a plan view of the basket showing it as it appears when packed with a commodity.

Fig. 4 is a perspective view, partly in section, showing another way of making the basket, particularly the smaller sizes which permit only the two opposite long side walls to be bulged inwardly.

Referring to the drawing by reference characters, 5 designates the double-ply bottom, 6 the side walls of the basket, which are as usual continuations of the overlapped bottom members 5. 7 indicates the inner rim band or strip and 8 the outer rim band or strip, these strips being wound around the top edges of the side walls in the usual manner and stapled to each other and to the side walls by staples 9. As will be observed from Fig. 1, the side walls 6, together with their attached rim bands curve or bulge inwardly to a small degree. These inwardly bulged side walls and rims, however, are sufficiently resilient to be readily sprung outwardly to a straight line by the pressure of the commodity when the same are packed therein, as shown in Fig. 3.

One way of making my basket is shown in Fig. 2. I employ a form 10 of the usual tapered shape to give the usual taper to the basket. The side walls of the form are not flat as usual, but are each concaved or depressed from one corner to the other of the form. In connection with this form, the usual staple drivers 11 are employed which cooperate with the usual tension-blocks 12 for clinching the staples, these tension-blocks being as usual mounted in recesses in the body of the form. Two staple drivers are employed, one at each side of the mid-length side wall of the basket. Before the stapling operation is performed, the two rim bands and the intermediate wall are forced inwardly to conform to the concavity formed in the wall of the form, this deformation of these parts being formed by pushbars or formers 13 which, of course, may be operated by a suitable part of the basket-making machine. After the side wall and the rim-bands are thus deformed and while held in that deformed position, the saple drivers are operated to insert the staples in the usual fashion. When all four sides of the basket are thus bulged inwardly and stapled the box, when removed from the form, assumes substantially the shape shown in Fig. 1, that is, with its rims and side walls bulged inwardly to a more or less degree.

The walls and rim bands maintain their inward curvature when removed from the form by reason of the fact that their natural tendency to straighten is resisted by the arch-like formations set up by stapling the two bands together, so that they cannot slide on each other, which they would have to do in order to straighten without pressure from within. In other words, by locating the staples 9 at points at opposite sides of the mid-length of the bands, while the bands are in a curved or bent condition they are formed into a permanent arch-like structure so that before they can be straightened sufficient outward pressure must be exerted against the inner band or wall face to cause a tension stress to be set up in the outer band and a compression stress to be set up in the inner band. This tendency, however, to hold its curved or arch-like shape is not so great but that the pressure exerted on the inner walls by the packed commodity will be entirely sufficient to overcome the normal tendency of the bands to curve inwardly and thus permit them (because of the natural elasticity of the wood) to be straightened out to give the basket the desired rectangular shape, as shown in Fig. 3. It will be observed that it is important that the bands and the intermediate wall shall be bulged inwardly before the stapling is performed and held there until the stapling operation is completed, and it is also believed to be important that at least two staples shall be used in each rim, one at each side of a point mid-way of the length of the basket-side, where, as shown in Fig. 1, all four sides of the basket are to be rendered expansible.

In Fig. 4, I illustrate another way in which the smaller sizes, such as pints and half-pints may be made. In this type of basket it is possible to have only the two longer walls of the basket arched inwardly. This may be readily done by having the side walls of the usual tapering form 14 cut away at 15 so that when a metal band 16 is pushed over the basket while the same is on the form the inwardly curved opposite sides of the band 16 will cause the opposite side walls of the basket to be arched inwardly and held in that position while being stapled. This method of making baskets is possible of use in connection with the smaller type of basket-making machines, in which the work of assembling the parts on the form is done manually.

I have referred to my method as being especially adapted for smaller sizes of baskets, but it will be understood that it may be equally well used in the manufacture of the larger types such as 2-quart or 4-quart baskets.

I claim:

1. A method of making rectangular veneer baskets having a veneer bottom and side walls and a veneer rim-structure consisting of an outer band and an inner band fastened together around the rim edges of said side walls, consisting in arching or bulging at least two of the opposite rims inwardly together with the upper parts of their attached side-walls and then while held in that bulged or arched position fastening said rim bands together and to the intermediate side wall by means which alone will not only retain the bands and the walls in their bulged-in position against their tendency to straighten but will render them capable of flexing outwardly under pressure from within the basket.

2. A method of making rectangular veneer baskets having a veneer bottom and side walls and a veneer rim-structure consisting of an outer band and an inner band fastened together around the rim edges of said side walls, consisting in arching or bulging at least two of the opposite rims inwardly together with the upper parts of their attached side-walls and then while held in that bulged or arched position fastening said rim bands together and to the intermediate side wall by means of two fastening devices extending through the rim bands and the intermediate body wall and located at points at opposite sides of the mid length of the side wall to thereby serve alone to retain the bands and the walls in their bulged in position against their tendency to straighten and yet render the bands and walls capable of flexing outwardly under light pressure exerted outwardly on the inner bands by the contents of the basket.

3. A rectangular veneer basket having a veneer bottom and side walls and a veneer rim structure, this rim structure consisting of veneer bands embracing the rim edges of said walls, two of the opposite rim bands with their attached walls being bulged or curved inwardly, and two fastening devices passed through each of said curved rim bands and the intermediate wall, these fastening devices being located one at each side of the mid-length of the bands to thereby resist the normal tendency of the bands to spring outwardly to a straight position and yet permit the rim bands to be straightened by a light pressure from within the basket.

4. A rectangular veneer basket having a veneer bottom and side walls and a veneer rim structure, this rim structure consisting of veneer bands embracing the rim edges of said walls, two of the opposite rim bands with their attached walls being bulged or curved inwardly, and fastening devices passed through each of said curved rim bands and the intermediate wall, these fastening devices being positioned to resist the normal tendency of the bands to spring outwardly to a straight position and yet permit the rim bands by reason of their inherent elasticity to be straightened by a light pressure from within the basket.

SYLVESTER H. HUNT.